Oct. 30, 1923.

T. DAVIS 1,472,053

MOLD FOR RUBBER GOODS

Filed Nov. 25, 1921

INVENTOR
Theron Davis,
BY
W. B. Hutchinson.
ATTORNEY

Oct. 30, 1923.
T. DAVIS
1,472,053
MOLD FOR RUBBER GOODS
Filed Nov. 25, 1921     2 Sheets-Sheet 2
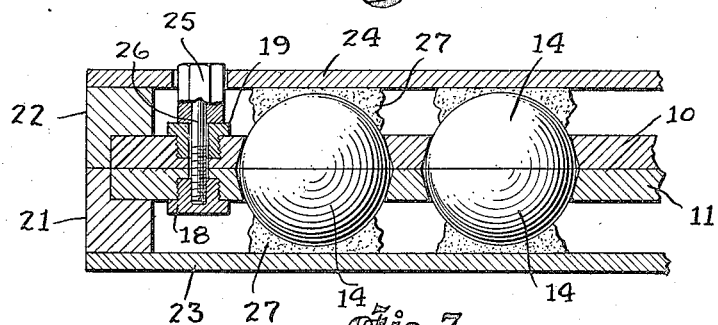
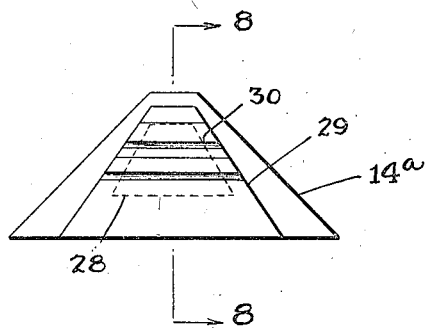
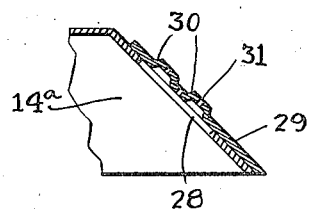
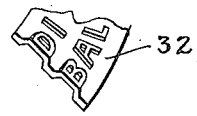
INVENTOR
Theron Davis.
BY
W. B. Hutchinson.
ATTORNEY Patented Oct. 30, 1923.

1,472,053

UNITED STATES PATENT OFFICE.

THERON DAVIS, OF NEW YORK, N. Y.

MOLD FOR RUBBER GOODS.

Application filed November 25, 1921. Serial No. 517,462.

*To all whom it may concern:*

Be it known that I, THERON DAVIS, a citizen of the United States, and a resident of the city, county, and State of New York, have invented a new and useful Improvement in Molds for Rubber Goods, of which the following is a full, clear, and exact description.

The object of my invention is to provide lighter, cheaper and more effective molds for vulcanizing rubber articles, and particularly that class of rubber articles known as "blown rubber goods," such as hollow balls, bulbs and the like. A further object of my invention is to give a smoother finish to the rubber articles vulcanized, and to provide a perfect registry of the opposing members of the mold without the use of the customary dowel pins. A still further object of my invention is to provide a completed mold in which removable name plates can be used without injuring or defacing the mold members.

It is well known that molds for rubber articles are customarily made from thick solid plates, usually of cast iron. In one plate is machined cavities representing one portion of the article to be vulcanized, and in the other plate is machined cavities conforming to the other portion of the desired article. When the molds are brought together the respective cavities oppose each other and the entire cavity gives the desired shape to the article to be formed. Usually a set of molds contains a plurality of cavities. It is apparent that in such molds great care must be taken to have the opposing cavities meet with exactness, and that in making balls or bulbs, thick metal plates will be necessary. Frequently a set of molds thus made weigh 200 pounds, and are difficult to handle, especially when heated as required in vulcanization. If made of cast metal they are likely to crack if roughly used.

I accomplish these results by fastening together two light steel plates each preferably of one-eighth of an inch thickness, and then drilling through the locked plates holes of the desired size and in the desired positions. The plates are then separated. I then form thin steel shells of preferably about one-thirty-second of an inch thickness with the interior of each of the desired form of approximately one-half of the article to be formed. I make these shells by spinning or stamping the sheet metal. They are then inserted in the plates, care being taken to insert them from the side of each plate that was joined to the other when drilled. The result is that the respective cavities will face each other with exactness. In the making of balls and the like, the inside edge of the drilled holes can be given a slight taper corresponding to the taper of the curved shell at its upper portion. The top portion of each shell is allowed to protrude slightly so that a perfect closure of the shell cavities is made when the opposing members are brought together. The shells are then permanently fastened in the respective plates by brazing, welding, or in any preferred manner. The interior of the shells can then be polished, thus giving to the rubber articles to be formed a smoother surface than can be secured in a cast metal mold. After the completion of the mold members I fasten one of the members to a metal frame which contains sufficient space to prevent the shell cavities from extending below the frame. Around the top sides of this frame I fasten a strip of metal, sloping slightly from the lower inside edge upward and outward. As the two mold members are of the same dimension, the other member can be set upon the lower member in such a manner that the sloped strips will cause it to fall within the enclosure formed by the strips, thus insuring perfect registry of the mold cavities without the use of the customary dowel pins. The molds can then be fastened together in any usual or preferred way.

In some types of bulbs, particularly tank balls, it is desirable to have certain letters or words embossed upon them. The customary way is to stamp these letters or words on the inside of the cavities of one of the mold members. It is obvious that such stamping is difficult, as the cavities are curved and sloping. If so stamped, the letters cannot be removed without disfiguring the mold. By my invention I make a complete mold member which has a permanent cavity in which a small insert bearing any desired lettering can be placed. In order to do this simply, I cut away a portion of the steel shell. I then make a covering for the opening from thin steel to conform to the exterior surface of the shell, of such size that when placed over the opening, the edges will extend upon the portion of the shell around the opening. By means of a die, certain portions of this covering are slightly indented. The covering is then welded or otherwise securely fastened to the shell, forming a complete covering of the opening in the shell. Then a thin insert plate can be lettered as desired and inserted into the recess. The indented portions of the covering will allow for the embossed letters. This insert can be made to fit closely and tightly in the recess, or it can be securely fastened in by soldering. I provide two or three small openings on the upper side of the covering so as to permit pushing out the insert if desired. It will be obvious that the molds made in this manner can be used with different lettering by simply changing the insert, while by the ordinary method of lettering, a different mold member must be used for each change in the lettering.

These and other objects of my invention will be better understood from the description which follows, and from the drawing which illustrates a way of carrying my invention into effect, in which similar characters refer to similar parts throughout the several views.

Figure 6 is a broken sectional view showing the mold adapted for use in a press.

Figure 7 is a side elevation of a mold shell adapted to receive a marking insert.

Figure 8 is a broken cross section on the line 8—8 of Figure 7, and

Figure 9 is a broken detail of the insert.

Figure 1:
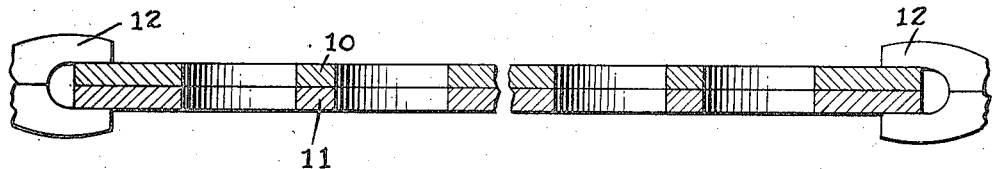
Figure 1 is a broken cross section showing the two mold plates held in position for drilling.
Figure 2:
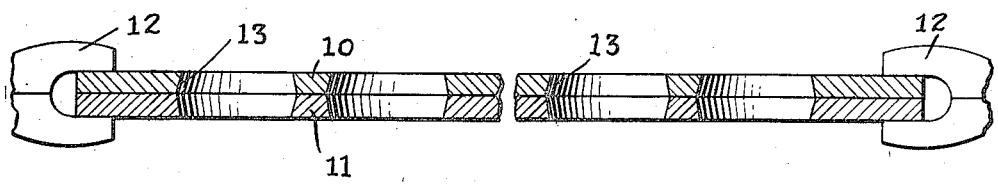
Figure 2 is a view similar to Figure 1, but with the walls of the drilled holes tapered or shaped.

The body portion of the mold comprises two similar plates 10 and 11 preferably of steel and these are firmly fastened together in any convenient way, as for instance, by soldering them together, and melting out the solder after they are drilled, or they can be held by suitable clamps 12, as shown in the drawing. The plates are then both drilled while fastened together, thus making it certain that the holes shall be in absolute registry, and the walls of the holes can be tapered as shown at 13 in Figure 2, so that the tapered parts will correspond to the parts of the shells 14 which they are made to receive.

Figure 3:
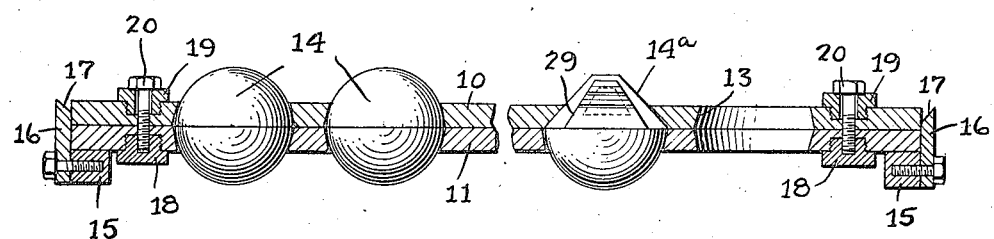
Figure 3 is a broken cross section of the mold plates with the mold shells therein, and also showing the means of holding the mold in a frame.
Figure 4:
Figure 4 is a detail section of one of the mold shells.
Figure 5:
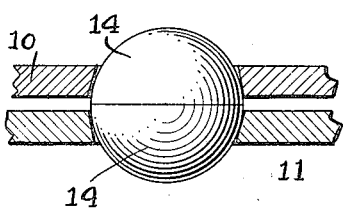
Figure 5 is a detail showing how the two shell members meet.

The shells 14 are of thin sheet metal, preferably steel, and the members 14 are shaped in semi-spheres so as to receive and give shape to the ball, but obviously they can be of other shapes, as for instance like the member 14ª in Figure 3, which is shaped to form the upper part of a tank ball. These shells or mold members 14 or 14ª as the case may be, fit snugly in the corresponding openings of the plates 10 or 11, and against the walls 13 thereof, and the members are preferably held so as to project slightly above the adjacent surfaces of the plates 10 and 11, so as to make clean cut meeting edges which will be in absolute registry when secured as specified. In order that they may be held permanently in the plates 10 and 11, they are welded, brazed, or otherwise fastened.

The mold as a whole is a multiple mold as shown, and it is preferably held for convenience in a frame which renders it easy to fasten the two mold members together in the right relation. This frame as illustrated is composed of the bottom rails 15 and side rails 16, both being preferably of metal, and bolted or otherwise fastened together, the side rails having their upper edges inwardly sloped or inclined as shown at 17, while the bottom part of the frame is rigidly secured to the bottom plate 11. Thus the mold members, to wit, the plates 10 and 11, and the shells which they carry, can be readily separated, and the upper member 10 can be quickly dropped into right relation with the lower member because of the inclined parts 17 which guide it to its seat.

The two plates 10 and 11 can for vulcanizing purposes be quickly secured together by any suitable fastening device. In Figure 3 I have shown such a device which is practical, but without the idea of limiting the fastening means to the structure shown. As illustrated, a nut 18 is screwed at appropriate points, preferably near the edges of the structure, to the under side of the plate 11, while a corresponding nut 19 is screwed to the upper side of the plate 10. A bolt 20 extends through the upper nut 19, through the two plates 10 and 11, and engages an internal thread in the lower nut 18. A few turns of the bolt suffices to lock the plates securely together. It will be seen that with the form of frame shown no guide pins are necessary, and they can be readily locked by many well known locking devices.

In Figure 6 I have shown the adaptation of the mold to a vulcanizing press. In this case the mold members are precisely as already described, but the holding frames are slightly different to make the structure suitable for a vulcanizing press. As here illustrated, the plates 10 and 11 are secured in corresponding frames 22 and 21, the lower frame 21 having a closed bottom 23 and the upper frame 22 having a closed top 24.

The parts are held together in a manner similar to the locking of the plates 10 and 11 already described, that is to say, the nuts 18 and 19 are used on the plates 11 and 10, but a bolt 25 with an elongated head 26 extends through an opening in the top plate 24, and the shank of the bolt extends from the nut 19 through the two plates 10 and 11, and engages the nut 18. This fastening structure is incidental, however, and a different fastening means can be used if preferred.

In a closed framework such as shown in Figure 6, it is desirable to bring a good heat conducting metal in contact with the shells, in order that they may have sufficient heat for vulcanizing purposes, and consequently the shell members 14 are backed by metal strips 27 which carry the heat to the shells. These strips act as contacts which carry sufficient heat to the shells to properly vulcanize the material which is in contact with them.

In Figures 7 to 9 I have shown a means for embossing a name or design on the articles under treatment, which is a very desirable thing to do, and my structure enables it to be readily and nicely done. The thin shell of the mold, for instance the shell 14$^a$ as illustrated, is obviously too thin to be countersunk and provided with a design suitable for embossing the article under treatment, and therefore I cut an opening 28 through the wall of the shell, and cover this with a second strip 29, which is securely fastened to the wall of the shell, and which is relieved at desired points as shown at 30, so that an insert 32 can be placed in the opening 28, and the relieved parts 30 will make room for the sunken characters on the plate 32. The backs of the recesses parts 30 can be pierced at 31 so that the plate 32 can be pushed from the opening 28 when desired. The insert 32 can be fastened in place by soldering, or by any suitable or preferred means.

I claim:—

1. A mold member comprising a metallic plate having openings therethrough with tapering walls, and sheet metal shells constructed to form mold cavities, said shells being tapered exteriorly to correspond with the tapering walls of the metallic plate and being larger at their open ends than the openings in the plate, whereby the shells may be driven firmly into the said openings and wedged into their seats.

2. A vulcanizing mold comprising a frame, a plate secured in the bottom of the frame, with the sides of the frame projecting above the plate, said plate having shells secured therein and projecting therefrom, a second plate having similarly arranged shells with the shells projecting in the opposite direction, and means on the sides of the frame for guiding the second plate to its seat against the first plate whereby the shell edges of the two plates are brought into accurate registry.

3. A mold comprising a plate having openings therethrough, sheet metal shells secured in the said openings, a frame extending around the edges of the plate and secured thereto, with the sides of the frame projecting above the plate, a second plate likewise provided with shells, means on the sides of the frame for guiding the second plate to its seat with the shells of the two plates, in registery, and means for locking the two plates together.

4. A vulcanizing mold comprising a plate having sheet metal shells secured therein with their backs projecting from one side of the plate, a frame in which the said plate is secured, a second plate having shells like the first plate, but projecting in opposite directions, means on the frame for guiding the second plate to its seat on the first plate with the edges of the opposed shells in registry, and means for fastening the two plates together.

5. A vulcanizing mold comprising opposed plates having thin sheet metal shells secured therein and projecting in opposite directions so that the edges of the shells may be brought into registry, frames for the two plates, metallic heat conducting contacts for the shell members, and means for locking the plates and frames together with the edges of opposite shells in registry.

6. A vulcanizing mold according to claim 5, characterized by the further fact that a single locking mechanism secures the plates and frames together.

7. In a structure of the kind described, the shell member having a portion of its wall cut away, an external cover secured to the wall and covering the cut away portion thereon, said cover having recessed portions, and an insert adapted to fit in the cut away part of the shell.

8. A vulcanizing mold comprising opposed plates having holes therethrough, sheet metal shells contained in the openings and meeting edge to edge, a supporting frame for the plates, and heat conducting material carried by the frame and abutting with the backs of the shells.

THERON DAVIS.

Witnesses:
JAY EMANUEL,
M. G. O'DONNELL.